Nov. 12, 1940.      F. A. DOTTERER      2,221,078
HEADLIGHT BEAM INDICATOR
Filed July 8, 1938

Inventor:
Frank A. Dotterer
By Brown Jackson Boettcher Dienner
Attys

Patented Nov. 12, 1940

2,221,078

UNITED STATES PATENT OFFICE 2,221,078

HEADLIGHT BEAM INDICATOR

Frank A. Dotterer, Logansport, Ind., assignor to R-B-M Manufacturing Company, Logansport, Ind., a corporation of Indiana Application July 8, 1938, Serial No. 218,243

7 Claims. (Cl. 177—329)

The present invention relates generally to headlight beam indicators for use on automobiles, and more particularly has to do with the means for mounting the indicator assembly on the dashboard or instrument panel of the automobile.

It has now become the general practice in automobile lighting systems to provide at some suitable place on the dashboard or instrument panel of the automobile where it can be readily seen by the driver of the automobile, an indicator assembly comprising a small colored jewel or eye on the front of the panel which will be illuminated by an electric lamp mounted in rear of the panel, the lamp being energized when the headlight switch is operated to produce a particular headlight beam, whereby the driver of the automobile by merely glancing at the jewel or eye will know what headlight beam he is using.

The present invention has for its principal object to provide a headlight beam indicator assembly that is simple in construction and can be easily and quickly secured in position at any desired point on the dashboard or instrument panel.

It is another object of the invention to provide an assembly of this type comprising a light transmitting sleeve member adapted to be inserted in a hole in the instrument panel and a lamp supporting socket having means adapted to cooperate with the sleeve member in rear of said panel for locking said sleeve member in position in the panel and supporting said socket from said sleeve member.

Other objects and advantageous features of the present invention will be apparent from the following description of the preferred embodiment of the invention taken in connection with the accompanying drawing, in which.

Figure 1:
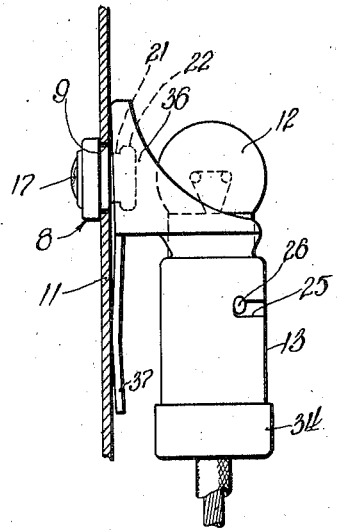
Figure 1 is a side elevational view illustrating my improved headlight beam indicator assembly mounted in position on a dashboard or instrument panel of an automobile.

Referring to the drawing, the indicator lamp assembly of the present invention comprises a light transmitting sleeve or ring member 8 supported in an opening 9 provided therefor in the dashboard or instrument panel 11 of an automobile, and a light bulb 12 supported in rear of said panel in line with the light transmitting opening in said sleeve by a lamp socket 13 that is in turn supported by said sleeve as hereinafter described, whereby the light will be transmitted from the light bulb on the rear side of the panel through the sleeve to the front of the panel.

Figure 4:
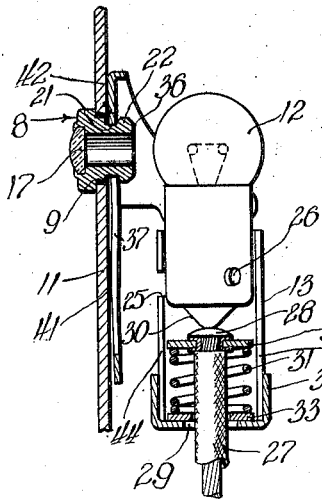
Figure 4 is a central vertical cross-sectional view through the indicator assembly and supporting panel, the light bulb being shown in elevation.
Figure 5:
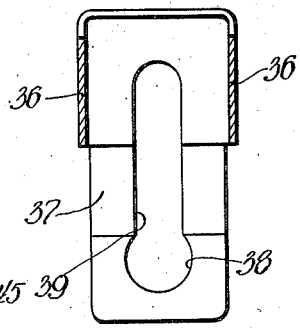
Figure 5 is a vertical section taken substantially on the plane of the line 5—5 of Figure 3 and illustrating the keyhole slot in the socket supporting bracket to provide for connecting the bracket to the jewel supporting sleeve.
Figure 6:
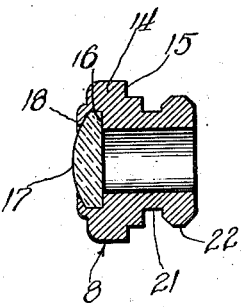
Figure 6 is an enlarged vertical section through the jewel supporting sleeve.

As best shown in Figure 6, the light transmitting sleeve 8 is provided with an enlarged head portion 14 at its forward end whereby the shoulder 15 formed by said head rests against the front or outer face of the panel 11 and holds said sleeve against rearward movement relative to the panel when the sleeve is inserted in the opening 9 of the panel as shown in Figures 1 and 4. In the preferred form illustrated, a recess 16 is provided in the front or outer face of the head portion 14 for receiving a jewel 17 of red or other suitably colored translucent material, such as glass, said jewel being held in position in the recess by curling or crimping the metal of the sleeve over the outer face of the jewel adjacent the outer periphery thereof as shown at 18. The provision of the colored jewel 17 in the sleeve is, however, not essential, as it may be omitted and the rays of light from the bulb 12 be transmitted directly through the opening of the sleeve if desired, as will be readily appreciated.

Adjacent its rear end the sleeve 8 has formed therein a circumferential groove or recess 21 to provide an annular flange 22 at the rear end of said sleeve, the purpose of which will hereinafter appear. As shown in Figures 1 and 4, the circumferential groove 21 is spaced from the head portion 14 of the sleeve a distance substantially the thickness of the panel 11, so that such circumferential groove is positioned on the rear side of the panel as shown in Figures 1 and 4.

Figure 2:
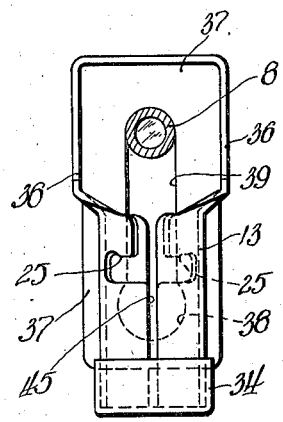
Figure 2 is a rear elevational view of the combined lamp socket and bracket assembly with the jewel supporting sleeve being shown in section.
Figure 3:
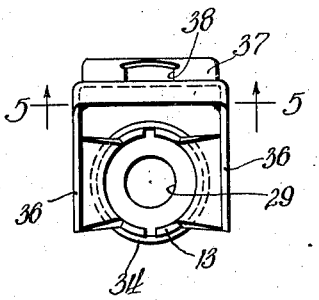
Figure 3 is a top plan view of the combined lamp socket and bracket assembly.

The lamp supporting socket 13 is supported from the ring member 8 by means that will be hereinafter described, and as usual such socket is in the form of a cylindrical member provided with a pair of oppositely disposed bayonet slots 25, best shown in Figure 2, with which a pair of oppositely disposed outwardly extending studs 26 (one of which is shown in Figures 1 and 4) provided on the base portion of the light bulb 12 are adapted to cooperate in the usual manner for insertion of the light bulb in the socket and for holding it in position therein. In the present construction, as is usual in automobile lighting systems, the grounded polarity of the battery is transmitted through the lamp socket and through the metallic sleeve and studs 26 carried by the base of the lamp to one side of the lamp filament, while the other polarity of the battery is transmitted to the other side of the lamp filament by means of a wire 27 extending through an opening 29 in the bottom wall of the lamp socket and having a contact member 28 at its upper end adapted to be held in tight contact with a contact member 30 on the lower end of the base portion of the lamp bulb by means of a coiled compression spring 31 interposed between a washer 32 of insulating material carried by the contact member 28 and a washer 33 of insulating material positioned in the bottom of the socket, see Figure 4, the spring 31 acting to hold the contact member 28 tightly in engagement with the contact member 30 on the lamp base, and also holding the studs 26 of the lamp in locking engagement with the bayonet slots 25 of the socket.

The opposite end of the wire 27 is adapted to be connected in any suitable manner with the headlight beam controlling switch of the automobile whereby when the switch is actuated in a particular manner the wire 27 will be placed in circuit to thereby energize the light bulb and illuminate the jewel or eye 17. The lower end of the socket 13 is preferably reenforced and stiffened by a cup member 34 that is welded or otherwise suitably secured thereto.

Preferably, but not necessarily, formed integral with and extending outwardly and upwardly from the upper end of the lamp socket 13 at opposite sides thereof is a pair of spaced arms 36, and extending between such arms and preferably but not necessarily formed integral therewith is a bracket member or plate 37 that extends substantially parallel to the axis of the socket member 13 as best shown in Figures 1 and 4. As shown, the bracket or plate 37 extends a considerable distance below the lower edges of the arms 36, and the purpose of providing this relatively long vertically extending bracket will hereinafter appear. The bracket 37 is adapted to be connected to the sleeve member 8 whereby the socket 13 will be supported from such sleeve member, and for that purpose the bracket member 37 is provided with a vertically extending keyhole slot having a lower circular portion 38 of sufficiently large diameter that will permit the annular flange 22 on the rear end of the sleeve 8 to pass through such portion when connecting the bracket to the sleeve, and an upper generally rectangular shaped portion 39 communicating with and extending upwardly from the circular portion 38 and of a width to receive between the side margins thereof the recessed portion 21 of the sleeve 8.

As before mentioned, the shoulder 15 on the head 14 of the sleeve 8 bears against the outer face of the panel 11 to hold the sleeve against movement in a rearward direction, and when the bracket 37 is slipped over the annular flange 22 of the sleeve 8 and slid down until the upper end of the slot 39 rests in the circumferential groove 21 the bracket 37 holds the sleeve against forward movement relative to the panel, whereby said sleeve is securely held in position in the opening 9 in the panel.

The lower portion of the bracket member 37 at a point adjacent the lower edges of the arms 36 is bent to normally extend forwardly from the plane of the upper front face of the bracket, as illustrated in reduced degree in Figures 1 and 4, so that when the bracket member is in position on the sleeve 8 the lower portion of the bracket at about the point 41 and the upper end of the bracket at the point 42 will press at these two points with a tight resilient pressure against the rear face of the panel 11 to hold the bracket and the sleeve in place and prevent them from becoming disengaged accidentally, and also to hold the bracket against swinging laterally on its pivotal connection with the sleeve, whereby the light bulb carried by the socket will be held in the proper position in line with the light transmitting opening in the sleeve 8. This tight resilient pressure is not encountered when the large end 38 of the keyhole slot is first slipped over the rear end of the sleeve 8, but builds up as the narrow upper portion 39 of the slot is slid downwardly over the groove 21 in said sleeve.

The socket 13 together with the arms 36 and the bracket 37 are preferably formed of a single flat stamping of relatively thin gauge sheet metal. The vertically extending front and rear slits or parting lines 44 and 45 which extend downwardly from the lower ends of the bayonet slots 25 to the bottom extremity of the socket indicate that the right and left halves of the socket 13 are rolled or curled out of flat tabs which extend downwardly from the arms 36 bent rearwardly from the front bracket portion 37.

It will be apparent from the above description that not only can the indicator lamp assembly be readily and quickly initially secured in position on the instrument panel or dashboard of an automobile without the use of screws, bolts or tools, but also that when it is necessary to renew the light bulb of the indicator it is only necessary to slip the socket member off of the sleeve and bring it out in front of the dashboard, replace the burnt out lamp with a new one, and again replace the socket member on the sleeve in rear of the dashboard, thereby avoiding the necessity of working in the cramped space in rear of the dashboard in renewing the lamp.

It is to be understood that while I have described above my invention as used in connection with headlight beam indicators for automobiles, the invention is not limited to such particular use, as my improved indicator lamp assembly may be used in other situations for which it may be adapted.

I claim:

1. An indicator lamp assembly comprising a light transmitting sleeve extending through an opening in a panel, means on said sleeve abutting the front face of said panel for holding the latter against rearward movement relative to said panel, a lamp supporting socket on the rear side of said panel, and means carried by said socket and slidable along the rear face of the panel into interlocking engagement with the inner end of said sleeve in rear of said panel for holding said sleeve against forward movement relative to said panel and for supporting said socket on said sleeve.

2. An indicator lamp assembly comprising in combination a light transmitting sleeve extending through an opening in a panel, a light bulb in rear of said panel for transmitting light rays through said sleeve, a lamp socket supporting said light bulb, a head portion at the forward end of said sleeve for holding said sleeve against rearward movement relative to said panel, an annular flange at the rear end of said sleeve, and a bracket carried by said lamp socket having a keyhole slot formed therein whereby said bracket may be slipped over said sleeve between said flange and said panel to thereby support said lamp socket on said sleeve and hold said sleeve against forward movement relative to said panel.

3. An indicator lamp assembly comprising in combination a light transmitting sleeve extending through an opening in a panel, a light bulb in rear of said panel for transmitting light rays through said sleeve, a lamp socket supporting said light bulb, a head portion at the forward end of said sleeve for holding said sleeve against rearward movement relative to said panel, an annular flange at the rear end of said sleeve, and a bracket carried by said lamp socket having a keyhole slot formed therein whereby said bracket may be slipped over said sleeve between said flange and said panel to thereby support said lamp socket on said sleeve and hold said sleeve against forward movement relative to said panel, the lower portion of said bracket being bent outwardly to exert a frictional pressure on the rear surface of said panel to thereby hold said bracket in position between said panel and said annular flange and prevent lateral swinging of said bracket on said sleeve.

4. An indicator lamp assembly comprising a light transmitting sleeve extending through an opening in a supporting panel, a circumferential groove in said sleeve on the rear side of said panel, a lamp supporting socket on the rear side of said panel, a pair of integral arms extending outwardly and upwardly from opposite sides of said socket, and means formed integral with and extending between said arms and having a slot formed therein for cooperating with the groove in said sleeve for supporting said socket on said sleeve and securing said sleeve in said panel.

5. An indicator lamp assembly comprising in combination a sleeve extending through an opening in an instrument panel, a jewel carried by said sleeve on the front side of said panel, a light bulb in rear of said panel for transmitting light rays through said sleeve to said jewel, a lamp socket supporting said light bulb in line with the opening in said sleeve, and means integral with said socket and slidable into engagement with means on said sleeve on the rear side of the panel for supporting said lamp socket from said sleeve and for securing said sleeve in said panel.

6. An indicator lamp assembly comprising a light transmitting sleeve extending through an opening in a supporting panel, a circumferential groove in said sleeve on the rear side of said panel, a lamp supporting socket on the rear side of said panel, and a pair of integral arms extending outwardly and upwardly from opposite sides of said socket and formed to provide a slot therebetween whereby said arms engage in said groove to thereby support said socket on said sleeve and secure the latter in said panel.

7. An indicator lamp assembly comprising a light transmitting sleeve extending through an opening in a panel, said sleeve having a circumferential groove in rear of said panel, a light bulb in rear of said sleeve for transmitting light rays through said sleeve, and an integral socket and bracket for supporting said light bulbs from said sleeve, said bracket having a slot formed therein and being slidable into engagement with said groove in said sleeve, said bracket being bowed and reacting against said sleeve and said panel for securing said sleeve in said panel.

FRANK A. DOTTERER.